Fig. 1.

E. KEEN.
TELEGRAPHY.
APPLICATION FILED OCT. 14, 1911.

1,176,149.

Patented Mar. 21, 1916.
6 SHEETS—SHEET 4.

WITNESSES:

INVENTOR
Eliot Keen
ATTORNEY

E. KEEN.
TELEGRAPHY.
APPLICATION FILED OCT. 14, 1911.

1,176,149.

Patented Mar. 21, 1916.
6 SHEETS—SHEET 5.

Fig. 18.

UNITED STATES PATENT OFFICE.

ELIOT KEEN, OF NEW YORK, N. Y.

TELEGRAPHY.

1,176,149.   Specification of Letters Patent.   Patented Mar. 21, 1916.

Application filed October 14, 1911. Serial No. 654,582.

*To all whom it may concern:*

Be it known that I, ELIOT KEEN, a citizen of the United States, residing in the city, county, and State of New York, have invented certain new and useful Improvements in Telegraphy, of which the following is a specification.

My invention relates to improved means for originating, transmitting and recording electrical impulses whereby a representation, pictorial or arbitrary, may be reproduced at distant points. In accomplishing this I not only avoid the use of sending and receiving apparatus at the terminal points necessarily operating in synchronism, but I also provide a mechanism permitting a much more rapid rate of transmission than has hitherto been possible in machines of this same general character and purpose.

My invention has particularly to do with a method of transmission at high speed which includes the reduction of the picture or representation to be reproduced to a half-tone plate of novel characteristics, which has contacting surfaces corresponding in area to the tones of the picture; the production from this plate of electrical impulses proportional in duration to the lineal dimensions of such areas; the recording by photographic means of such impulses, and the transformation of the record thus obtained into a substantial duplicate of the original sending plate or of the picture from which the latter was made. The invention which I claim herein is chiefly concerned with the first three steps of the process, as I may use any suitable apparatus for transforming the record into an exact reproduction or approximation of the original sending plate or representation, such, for instance, as that illustrated and described in my application for United States Letters Patent for improvements in telegraphy, Serial Number 548,047, filed March 8, 1910.

The fact that the sending and receiving machines are not run in synchronism, and the further fact that the impulses transmitted are not originally recorded so as to reproduce the form or shape of the corresponding contact areas on the transmitting plate, permit a vast increase in the speed at which the sending and receiving machines may be run under conditions of practical use. In the operation of my system it is, therefore, possible to transmit and record a series of impulses at high speed and thereafter to transform at leisure the record thus obtained into a substantial counterpart of the transmitting plate or of the original representation from which it was made. The advantages of this procedure are obvious, especially in long distance transmission, where the time element is a controlling factor in determining whether the tolls for wire service will be so heavy as to preclude the commercial use of the apparatus.

My invention is characterized by the novel feature of not reproducing directly at the receiving end a replica of the sending plate. Instead, I simply record at the receiving station in proper sequence upon a strip of photographically sensitive material, rectangles of constant width which are proportional in their length to the duration of the impulses caused by the contact point of the sending machine in passing over successive dots of the half-tone plate. I thus produce at the receiving station what I term a "record," which in turn may be used to originate impulses in a secondary and local sending circuit of a machine at the receiving station which will properly interpret them and reproduce a substantially correct representation of the original picture. This transformation may be accomplished entirely at the receiving station or elsewhere and does not require the use of the telegraphic transmission circuit connecting the original sending and receiving points, permitting that circuit to be used in other ways during the period when the record is being transformed.

While I may use as my original sending element a half-tone plate of the usual sort, that is, one produced from a double-line half-tone screen, I prefer to use what is known in the art as a single-line screen, and adjust this in the sending apparatus so that the contact lines, or lines of electrical contactivity, bear one of two definite relations to the path of the contact point across the face of the plate. Such a single line plate, especially when so disposed, has peculiar advantages which will be further set forth in detail.

In the accompanying drawings which form a part of this specification.

Referring to the drawings in detail, the numeral 1 designates a base plate upon which are mounted four standards 2, carrying the guides or tracks 3, slidably mounted upon which is the frame 4, which has secured to it the slotted guides 5 engaging the tracks 3. This frame carries at either side the racks 6 and 7, the teeth 8 and 9 of which, respectively, engage the worm gears 10 and 11 mounted upon shafts 12 and 13 supported by the bearing blocks 14 and 15 secured to the base plate. Mounted upon the two shafts 16 and 17, vertically above the shafts 12 and 13, are the pulley or guide wheels 18 and 19 carrying the belt 20. Gears 21 and 22 upon these upper shafts engage, respectively, gears 23 and 24 upon the lower shafts, the rotation of the lower shafts thereby being transmitted to the upper shafts. Mounted upon the opposite end of the shaft 12 from the worm gear 10 is a worm 25 engaging a worm 26 carried by a shaft 27 mounted in bearing blocks 28 affixed to the base plate. Upon the other end of this shaft is a similar worm 29 meshing with a worm gear 30 carried by the shaft 13. The extremity of the shaft 13 is secured to the driving shaft of an electric motor 31, or other means of obtaining positive rotation. It will thus be seen that rotation of the armature of this motor will cause the two shafts 12 and 13 to revolve, causing translation of the frame 4 and rotation of the belt 20 in a plane perpendicular to the direction of translation of the frame itself. Mounted upon the sub-frame 4 is a super-frame 32 bearing the contact-making plate 33. One side of the super-frame 32 is engaged by springs 34 permanently secured to the sub-frame. The other side is engaged by adjustable turn-buckle clamps 35, also secured to the sub-frame. These clamps, which are illustrated in detail in Fig. 6, comprise a pivot-joint 36, a turn-buckle member 37, and a clamp portion 38, the contact surfaces, 39, of which are formed of a non-conductor of electricity. A fulcrum 40 secured to the sub-frame engages the side of the super-frame midway between the springs. Angular pointers or registering indicators 41 are attached to the sub-frame and extend above and over the super-frame. These are adjusted to indicate the line of centers of a row of dots, and thereby guide the operator in adjusting a sending plate in position in the machine. Carried by the belt 20 are a plurality of contact points 42 adapted to play across the surface of the sending plate when the belt is in motion, the distance between the points being such that when one breaks contact with the plate, another is just coming into contact with it. The guide 43 is provided for preventing these points from coming into contact with the adjusting mechanism prior to making contact with the plate itself. A tensioning-member 44, preferably constructed of spring brass or some other resilient material, constantly bears against the belt carrying the contact points, and prevents it from becoming loose and slipping. A conical registering pin 130 extends radially outward from the periphery of the guide wheel 18. The function of this pin is to engage the hole 131 in the band 20 at each revolution of the wheel and thus cause the band to assume an absolutely fixed relation with respect to the other moving parts and so prevent any accumulation of the natural slip of belt and wheel which, if unchecked, would eventually throw the machine seriously out of adjustment.

Mounted upon one edge of the super-frame adjacent to that side of the transmitting plate which a contact point first touches in going across the plate is a strip of conducting material such as copper or brass 45 in electrical contact with the transmitting plate. From one terminal of the motor 31 a wire 46 extends to the rheostat 47, from the other terminal of which a wire 48 leads to a source of supply. The other terminal of the motor is connected by means of a wire 49 to the other side of this source of electrical supply. Connected to the bearing block 15, or some other portion of the mechanism which is in electrical contact with the belt 20, is a wire 50 leading to one terminal of the primary magnet of the relay 51, the other terminal of which is connected by the wire 52 to the battery 53, thence by wire 54 to one of the standards 2, or some other portion of the mechanism in electrical contact with the transmitting plate. Connected to the armature 55 of the relay 51 is a wire 56 leading to the battery 57, to the other side of which is connected one of the main line wires 58; the other main line wire 59 is connected to the operative contact point 60 of the relay 51. The wires 58 and 59 lead to the magnets of the receiving relay 61 mounted upon the base 62. Secured to this base is an upright partition 63, mounted in which is a lens-tube 64 extending through the partition and secured to it by means of the screws 65. At the outer extremity of the tube is a cap 66 in which is a narrow slit 67. Adjustably mounted in the other end of the tube is the lens-carrier 68 bearing the lens 69. The lens-tube has the internal threads 70 engaging the external threads 71 upon the lens-carrier. Rotation of the lens-carrier will therefore cause it to advance or recede within the lens-tube and enable proper focus to be obtained. The film box 72 provided with the runners 73 which slide on tracks 74 mounted upon the base, is adapted to slide in close contact with the inner surface 75 of the upright partition, and has a horizontal slit 76 registering with the axis of the lens 69. The box is provided with a shutter flap 77 hinged at 78 to the interior of the box adjacent to the slit therein and adapted to permit or prevent the passage of light through said slit into the box, according as the flap is in the raised or lowered position. The flap may be operated by means of the shaft 79 secured thereto and passing through the end of the box, and upon which is mounted a handle 80. Within the box is a film-carrying cylinder 81 which bears at one end a shaft 82 passing through a light-tight bearing block 83 in the end of the box and terminating in a collar 84 provided with a square opening 85 in the end thereof adapted to receive the squared end 86 of a shaft 87. A set screw 88 is provided for securing the shaft to the collar. The other extremity of the shaft 87 is carried by a bearing 89. Mounted upon this shaft is a worm 90 having a spline or feather entering a longitudinal groove or slot 91 in the shaft. Worm wheel 90 engages a worm 92 mounted upon a shaft 93 which is adapted to be rotated by an electric motor 94 or other source of power through the shaft 95 and the gears 96. Mounted upon the other extremity of the film-carrying cylinder is a cylindrical boss 97 projecting through a light-tight bearing in the adjacent end of the film-box and provided with a square hole to receive the squared end 98 of the screw shaft 99 passing through the internally threaded block 100.

Figure 9:
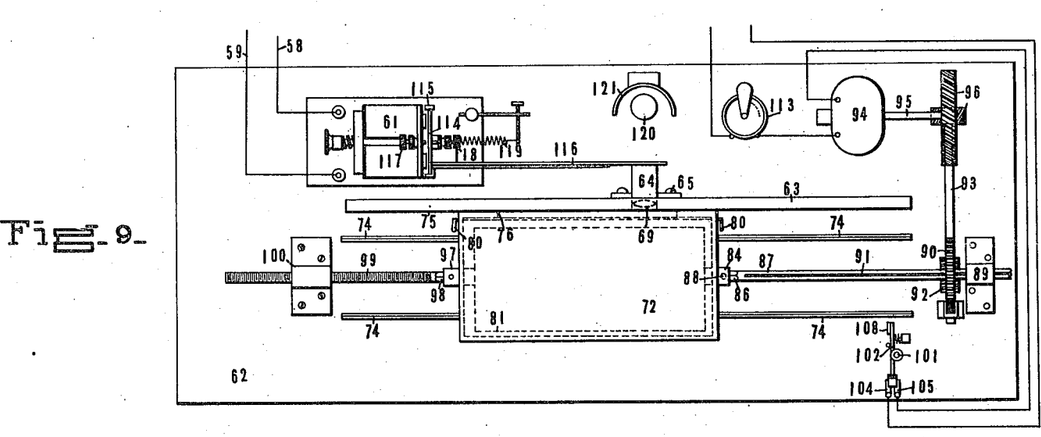
Fig. 9 is a plan view of the receiving machine and its electrical circuits.
Figure 10:
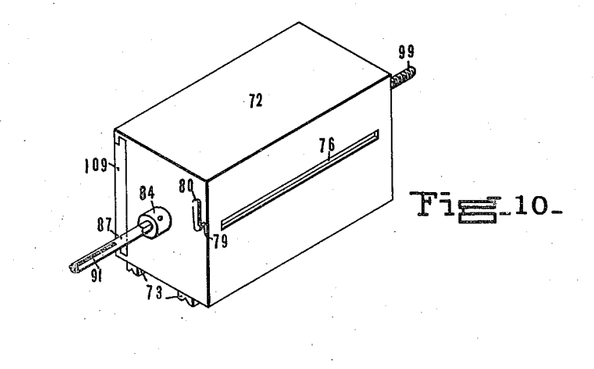
Fig. 10 is a perspective view of the film or record-inclosing-box.
Figure 11:
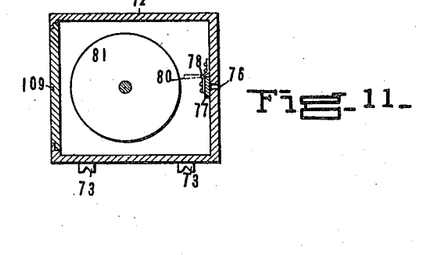
Fig. 11 is a transverse sectional view through this box.

It will thus be seen that rotation of the armature of the motor will be transmitted to the shaft 87, thence to the film-carrying cylinder and to the screw shaft 99, the rotation of which will cause the film box and film-carrying cylinder to advance in the direction indicated by the arrow along the tracks 74. An automatic switch 101 in the motor circuit is provided for preventing the progress of the film-box and cylinder beyond the desired limits. This switch consists of a centrally pivoted arm 102 having a contact brush 103 which is normally forced into a position to complete an electrical circuit between the contact plates 104 and 105 by means of the spring 106. A pin 107 prevents the spring from pushing the brush out of contact with the two contact plates. The switch is so placed that when the film-box reaches its limit of travel its end will strike the buffer 108 on the extremity of the lever, throwing it into the position illustrated by the dotted lines in Fig. 12, thereby opening the motor circuit and bringing the film-box to a stop. Access to the interior of the film-box is provided by means of the slide 109. The removal of the slide 109 permits a photographically sensitive film 110 to be wrapped about the cylinder and fastened in position by means of the clamp 111, which may be adjusted by the thumb-screw 112 entering a threaded socket in the cylinder. This clamp may preferably be made of some resilient material, such as spring brass. I find it desirable to provide one of such clamps at each extremity of the film-carrying cylinder. Included in the circuit of the electric motor is a rheostat 113, or other means whereby the speed of rotation of the motor may be adjusted.

To the armature 114 of the receiving relay, mounted in the trunnions 115, is secured an arm 116 adapted to reciprocate across the outer end of the lens tube and to prevent access of light to the slit 67 when the magnet of the relay is deënergized. The play of the armature between the adjusting screws 117 and 118, however, is sufficient to raise the arm 116 from in front of the slit 67 when the magnets of the relay are energized. A spring 119 causes the quick and certain return of the armature to its normal position when the current in the circuit of the magnets is broken. A source of light 120 is provided, having a reflector 121 adapted to concentrate the rays of light upon the region of the slit 67. This source of light may be of any suitable character, but is preferably of high specific value, such as that furnished by a Nernst, mercury vapor or other electric arc light.

Considering now the operation of the machine with respect to the sending mechanism: A half-tone plate, produced in the usual manner, upon a metallic base, and of coarse screen, that is, a plate having a comparatively small number of dots to the square inch, is placed between the guides forming the sides of the super-frame. This frame is then adjusted with respect to the sub-frame, which, from the nature of its construction, must travel in a predetermined path parallel to the two guides upon which it runs, by operating the two turn-buckles 37, the effect being to cause the super-frame to rotate about the fulcrum or knife-edge 40 until the line of centers of the half-tone dots upon the sending plate is parallel to the line of travel of the points on the contact-making ribbon as they sweep across the plate. When this condition is obtained the sending plate is moved within its guides in a direction parallel to the line of travel of the frame until a point is reached such that when one of the contact-making points just reaches the plate it will contact with the true center of the first dot in the row, that is, the dot nearest the edge of the plate which the contact point first strikes. When this adjustment has been effected, it will be found that the line of centers of the rows of half-tone dots is not perpendicular to the line of travel of the frame upon which the sending plate is located. This condition is necessary in order that when one contact point upon the contact-making ribbon reaches the extremity of its travel across the sending plate, the next point to contact with the plate must strike the next row of dots upon the plate in order to send the picture represented by the dots upon the plate by consecutive rows. The contact points are so spaced on the ribbon carrying them that when one has finished its travel across the plate and just broken contact with the last dot of the row, a fresh point will have reached the other extremity of the plate, and started to sweep across the contact strip 45 bordering the next consecutive row of dots. In order to accomplish the result of sending consecutive rows of dots smoothly and without interruption it is, therefore, necessary to have the center line or axis of the ribbon slightly inclined to the line of centers of the rows of dots on the sending plate, and this obliquity will be dependent upon the coarseness of the screen of the sending plate; that is, the number of dots per square inch in the plate representing the picture being transmitted.

In the operation of sending, the path of the current at the moment one of the contact points is bearing upon a dot of the half-tone sending plate, leads from the ribbon, through the contact point to the dot, from the plate, through the two frames and guides to the wire 54, battery 53, wire 52, magnet of the relay 51, wire 50, and some portion of the mechanism in electrical contact with the ribbon. The result of the passage of a contact point across a row of dots is, therefore, to energize the magnet of the relay 51 through periods which are directly proportional in duration to the lineal dimensions of the respective dots with which the point makes contact, inasmuch as the motor 31 is assumed to be a substantially constant speed motor; that is, one which under normal conditions of voltage, which may readily be obtained in practice from a commercial supply, will vary in speed of rotation only a fraction of a per cent. The speed at which the motor is to be run during the transmission of any one picture may be regulated by means of the rheostat 47, but it will not be necessary to adjust the rheostat during the transmission of the picture, nor is such adjustment desirable. The passage of a set of electrical impulses through the magnet of the relay 51, proportionate to the lineal dimension of the dots of the half-tone, sets up a magnetic field in such magnet whose duration will be approximately proportionate to the duration of the impulses. The armature 55 will, therefore, be attracted to its contact 60 in such manner that impulses corresponding to those originated in the local sending circuit will be set up in the secondary or main line circuit, which includes the armature of the relay 51, its contact, a main line battery or other source of electro-motive force, and the necessary line wires leading to the receiving machine. This impulse passing through the magnets of the relay 61 will attract its armature through intervals corresponding in duration to the intervals during which the contact point remained in contact with the dots upon the half-tone sending plate. The result of the consequent energization of the magnets of the relay 61 will be to draw the arm 116 from in front of the slit in the end of the lens-tube, and to permit light to enter the tube for periods corresponding to the periods during which the sending impulses persist. An image of the illuminated slit will be brought into sharp focus by the lens 69 upon the surface of the revolving film wrapped about the film-carrying cylinder, which at the same time is revolving and undergoing a motion of translation in a direction perpendicular to the axis of the lens.

Figure 8:
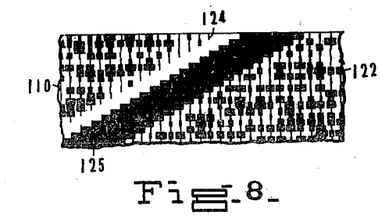
Fig. 8 is a representation of a record such as might be received upon the machine here-in described.

The result when the film is developed in the manner usual to photography will be the production of a record similar to that illustrated in Fig. 8. This record will consist of parallel rows of dots 122 which are uniform in width but vary in length, the length being proportionate to the impulses which have been transmitted by the sending machine and are, therefore, proportionate to the lineal dimension of the respective dots on the original half-tone sending plate, corresponding to the series of dots appearing upo nthe received record. This must necessarily result, since the width of any dot will be the width of the image of the slit in the end of the lens-tube cast upon the recording film, while its length is proportionate to the period during which light is admitted to the slit, since the film is continuously revolving on its cylinder. At the beginning of each row there will always occur a dot of a definite size, occasioned by the contact points contacting with the brass strip which the contact points touch before starting to traverse each row of dots. The character of the dots which will be found upon the record will vary widely. There will always be at least a minimum size dot, such as 124, since, by the reproduction of a photograph by the half-tone process, there is a certain minimum dot which will be found even in the portions of the half-tone corresponding to solid white in the picture which it represents. But in all cases, the length of the dots of the record will be directly proportional to the lineal dimension of the dots upon the sending half-tone, because the motor which is used to drive the mechanism of the receiving machine is of a type similar to that used in the sending machine; that is, having good speed regulation and being approximately constant in its velocity of rotation. By this it is not meant that the two machines operate in synchronism, the only requirement being that the speed of either shall not vary appreciably during the sending of any row of dots.

The portion 125 of the record, which is somewhat exaggerated in Fig. 8, represents the interval between the time when one contact-making brush leaves the end of each row and the next successive point contacts with the brass strip 45 adjacent to the half-tone sending plate. The center lines of the rows of dots upon the record film will appear as helices, which, when the film is unwrapped from its cylinder will degenerate into oblique lines across the face of the film.

It will be seen that the record produced as above described differs from what is produced by the facsimile telegraphs which have heretofore been proposed, in that it does not purport to be a reproduction of the original picture. It is merely a record of the successive elements of the original picture, but in the record these elements are not necessarily arranged in the relation which they occupy in the original picture, and therefore no pictorial effect is necessarily produced. The method of producing the record therefore is entirely different from the method of procedure followed in prior facsimile telegraphs in that no attempt at synchronism between the sending and receiving apparatuses is necessary. In a particular case synchronism may or may not exist, but the essential difference of method is that no attempt is made to produce synchronism, and of course in all ordinary cases there will be no synchronism, so that the record will be often indistinguishable as a picture. My complete process therefore requires a final step to produce the ultimate result, namely, the rearranging of the parts of the record so as to produce the desired pictorial effect of the original picture. Also, in the preferred form of my invention the elements of the record are of constant width and proportioned in length only to the size of the elements of the sending plate. As the elements of the sending plate vary both in length and width, the record therefore differs from the original picture in this respect also. To produce the most satisfactory result, I prefer, in reconstructing a representation of the original picture from the record, to produce areas corresponding to the areas of the original picture and not to the areas of the record, this being accomplished by taking the longitudinal dimensions of the elements of the record and squaring them, so to speak. In other words, the impulse which is produced from an element of the original picture is proportioned to one dimension of such element, and its duration is therefore proportional to the square root of the area of such element, and the corresponding area of the record is therefore proportional to the square root of the original area. In the transformation of the record into a facsimile of the original picture this characteristic dimension of the element of the record is squared so as to produce an area proportional to the square of the length of the element of the record and which will be directly proportional to the corresponding area of the sending plate. Of course, as set forth in my application referred to, Serial Number 548,047, the ultimate picture reproduced from the record may be composed of equal areas having tonal qualities corresponding to the areas of the sending plate, as well as by reproducing solid black areas of the same size as the areas in the original plate. In each case the quantity of light permitted to act upon the final sensitized surface is proportional to the corresponding area of the sending plate.

The preferred means for reconstructing the record produced by the apparatus set forth in this case consists of means which act by what amounts to counting of the dots of the record and arranged to produce rows properly alined, each containing a given number of dots, so that as the number of dots in a row in the original sending plate is known, the picture can be reconstructed by placing a corresponding number of dots in each row and properly alining them. The dots in the final picture can also be proportioned in size to the corresponding dots of the sending plate by measuring the longitudinal dimensions of the dots in the record and constructing symmetrical areas with such dimensions as diameters. Knowing the number of dots in a row of the sending plate, it would undoubtedly be possible to reconstruct a picture from a record such as I transmit, by hand, although the process would be laborious and lengthy. In my application above referred to, however, Serial Number 548,047, I have shown automatic mechanism adapted to rapidly reconstruct the picture in the manner described capable of acting either directly from a half tone sending plate or from sending plate prepared from a record such as that produced by the apparatus of the present application, and I prefer to use such an apparatus as that described in my application in carrying out the ultimate step of the process herein set forth, but the use of that apparatus is not essential to the process.

Figure 17:
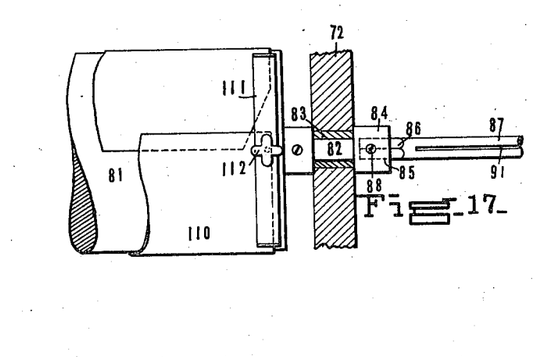
Fig. 17 is a side view thereof.

In placing a fresh film upon the film-carrying cylinder, the cylinder and its containing box may be bodily removed from the rest of the machine by loosening the screw 88, withdrawing the shaft 87 from the socket 84 some little distance, and then sliding the film box upon its guides in the direction of that shaft, so that the squared end 98 of the shaft 99 will no longer enter the socket 97. The box may then be lifted free of the guides. Before this is done, however, the shutter flap 77 is closed by means of the handles 80 into the position shown in Fig. 6, so that the admission of light to the box is effectually cut off. The box and its contents may then be removed from the machine and taken to a dark room. The slide 109 may then be thrown back, permitting access to the film-carrying cylinder. A fresh portion of film may be readily wrapped about the cylinder without removing the latter from the box and held in place by means of the spring clamps 111 at either end of the cylinder. The film is permitted to overlap slightly, as is shown in Fig. 17, in order to make sure that the record will be continuous. With the fresh film in place, the slide 109 is closed and the film box replaced in the machine and connected in operative position with respect to the driving shafts by a reversal of the operation by which it was removed from engagement with them. Turning the handles 80 will raise the shutter flap and the machine will be ready to receive a picture.

Figure 12:
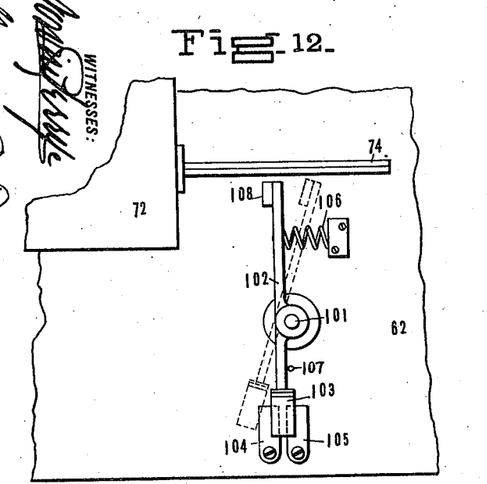
Fig. 12 is a detail view of the switch for automatically stopping the machine when the record is finished.
Figure 13:
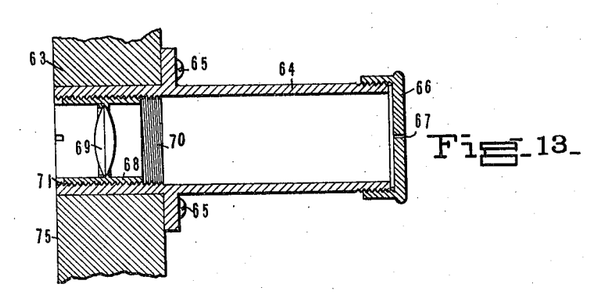
Fig. 13 is a detail sectional view of the lens and its tube.
Figure 14:
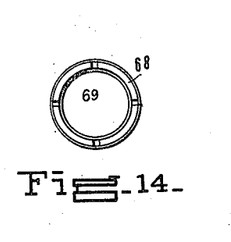
Fig. 14 is an elevation of the lens-carrying structure.
Figure 15:
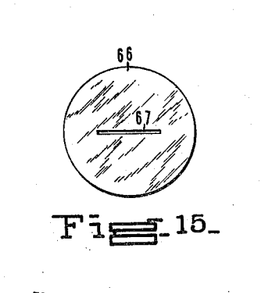
Fig. 15 is an elevation of the diaphragm in which is the light aperture.
Figure 16:
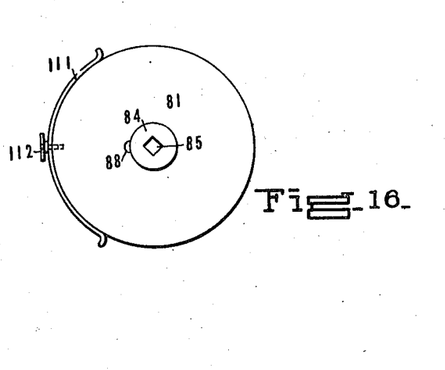
Fig. 16 is an end view of the film-carrying cylinder.

The switch 101 is placed in such a position that when the end of the slit 76 registers with the lens-tube opening, the receiving machine motor will be stopped. This not only protects the receiving apparatus from operating beyond the desired limits of travel of the film box, but gives notice that the operation of receiving upon that film is at an end.

It is not necessary that a new film be used for each sending plate creating impulses at the initial station, since a duplicate frame and plate supported thereon may be fed into the sending machine as the last row of a plate being sent is traversed by the contact points. By thus supplying a succession of plates to the sending machine, the latter may be operated continuously and large pictures transmitted without requiring the use of half-tone plates which exceed a size that may be conveniently prepared and handled, the only limit as to length being that established by the receiving apparatus.

Figure 18:
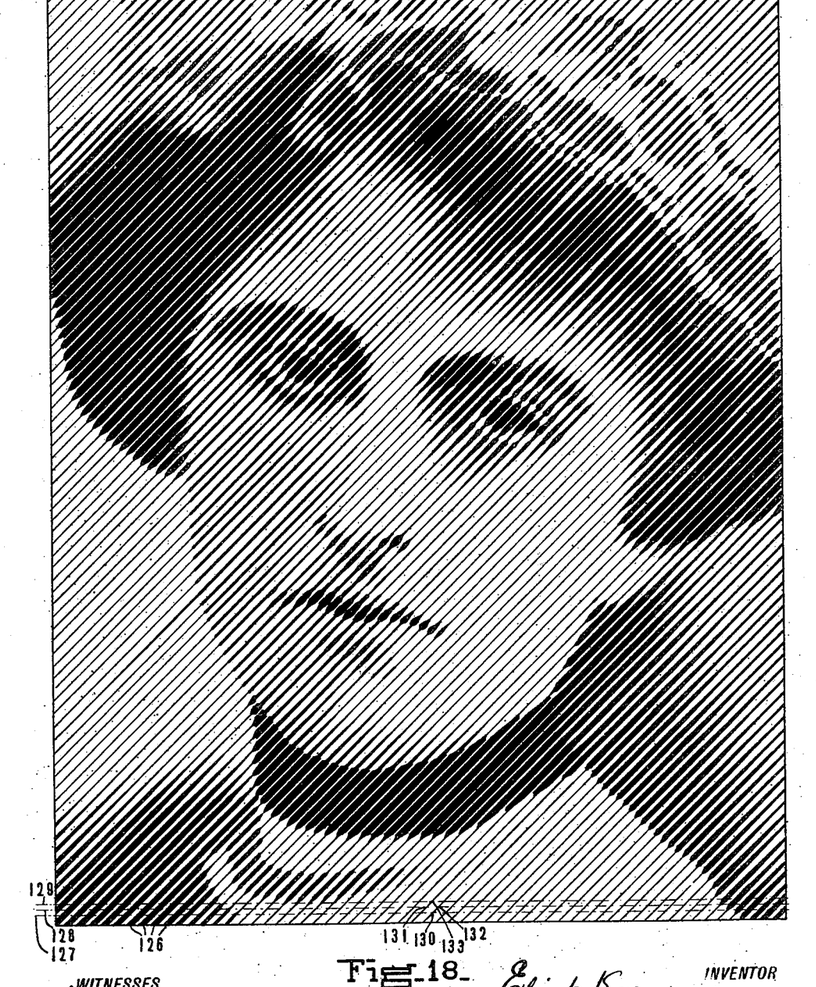
Fig. 18 is a representation of an improved form of sending plate.

In Fig. 18 I have illustrated a sending plate made from a single line half-tone screen, which is a preferred form for use in my improved apparatus. This plate, instead of having a plurality of dots in staggered relation, representing the tones of the picture, or other representation to be transmitted, has a plurality of parallel lines 126 of varying widths which determine the tones of the picture. Three consecutive paths of the contact points across the plate are denoted by the parallel dotted lines 127, 128 and 129. These lines of contact preferably cross the plate in such a direction that they will intercept the lines forming the contact areas at angles of 45 degrees. The effect of the contact point in passing over the lines in such a manner will be to originate in the sending circuit a series of impulses whose duration and spacing is substantially identical with those which would be produced by a half-tone plate formed from a double-line screen, as hitherto described. This will be evident if we consider a specific case, such as that of the impulse which will be originated when the tracer passes the point 130. It will be seen that when the contact point sweeps over the plate on its next successive journey across it, following line 128, it will make contact at the two points 131 and 132, among others, these points bearing a staggered relation to the point 130. When the tracer follows the next path 129 across the plate it will make contact at a point 133, which is on the same transverse axis as the point 130. It will thus be seen that as the points pass over the plate they will transmit impulses in the sending circuit which will have the same relation to each other as the impulses originating from a double-line half-tone plate. In other words, whichever plate is used the impulses will bear the same time realtion to each other and will be in length proportional to the tone of the picture or representation at that particular point. It will be obvious, therefore, that a record obtained at the receiving end from impulses originating from such a plate as has just been described will be identical with a record obtained from a half-tone plate formed from a double-line screen first described. There is this distinct advantage, however, inherent in the single line plate. Should the contact point in sweeping across a double-line half-tone plate, that is, one composed of dots, for any reason deviate even slightly from its true course, which coincides with the line of centers of a row of dots, the point will completely fail to make contact with the minimum size dot and will interpret the larger dots as being dots of a lesser diameter, since the point does not actually pass over the true diameter of the dot, but merely across a chord of an arc thereof. On the other hand, in the case of the single-line plate, the tracer can never fail to send an impulse of some kind, for the reason that however much it deviates from its true course, it will always encounter metal. It is true that such deviation may result in slight errors in tone at regions where the width of a line is rapidly changing, but this will cause such a small inequality in the picture as finally reproduced as to be unnoticeable. The sending of some sort of impulse for every tone representation of the original sending plate insures the transmission of the proper number of impulses for every path the contact point traces across the plate, and absolutely prevents the receiving mechanism of the reproducing device from gaining a step on the sending mechanism of the reproducing device, as explained in my said application for Letters Patent, Serial No. 548,047.

Figure 1:
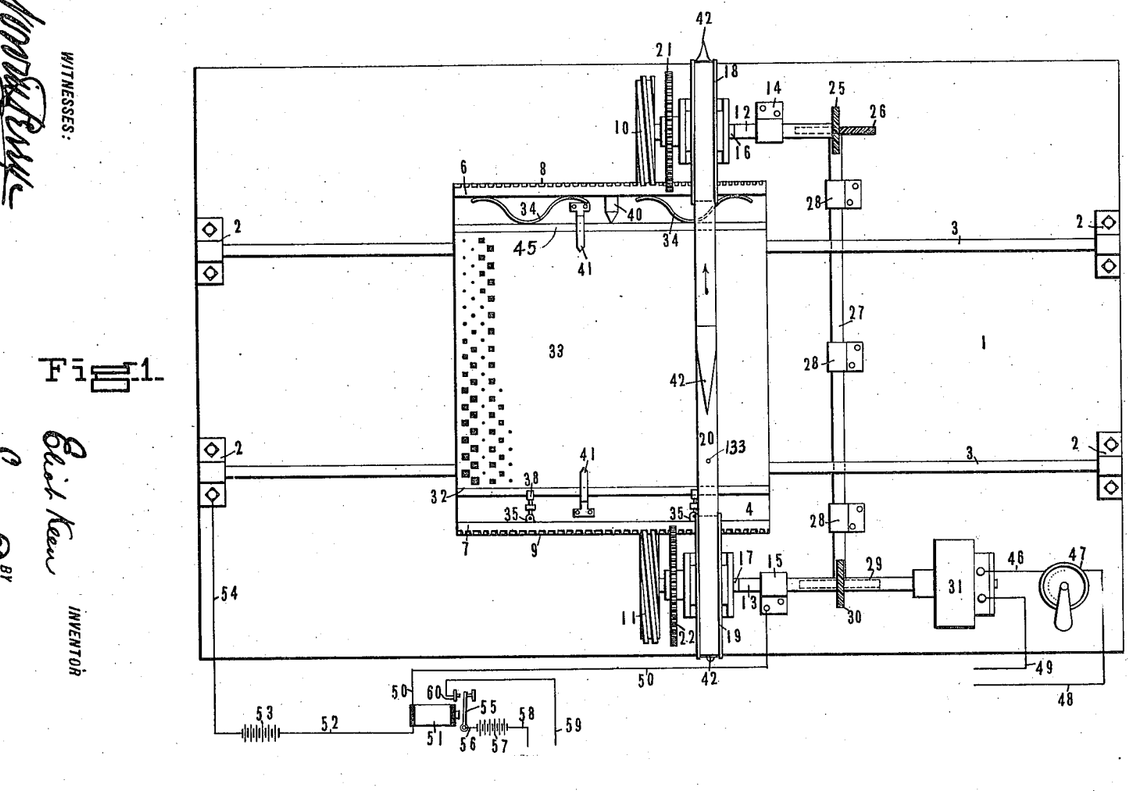
Figure 1 is a plan view of the sending machine and its electrical circuits.
Figure 2:
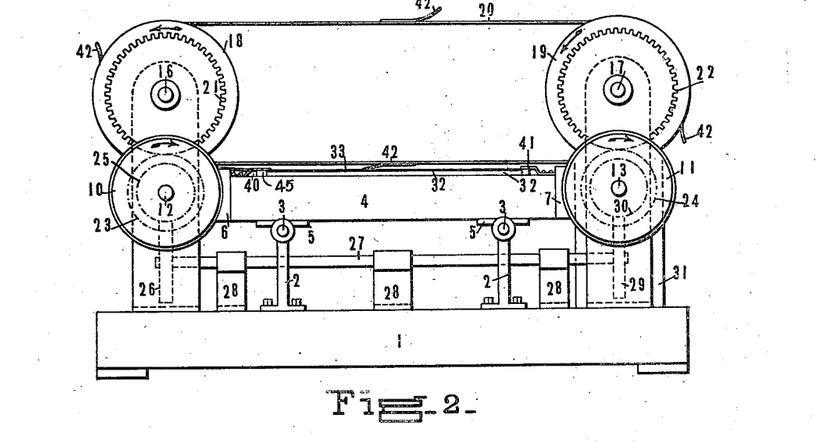
Fig. 2 is an end view of the sending machine.
Figures 3, 4, 5, 6:
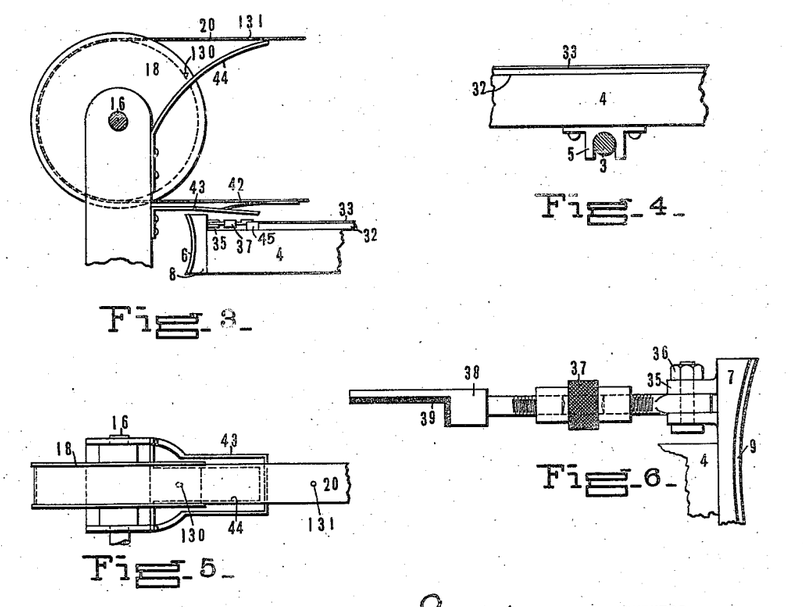
Fig. 3 is an enlarged detail of a portion of this sending machine, showing a contact-carrying belt, the sending plate and its carriage.
Fig. 4 is a detail sectional view of the track or runner and the carriage which slides upon it.
Fig. 5 is a top view of Fig. 3.
Fig. 6 is an enlarged view of the means for adjusting the transmitting plate in proper position.
Figures 7, 19:
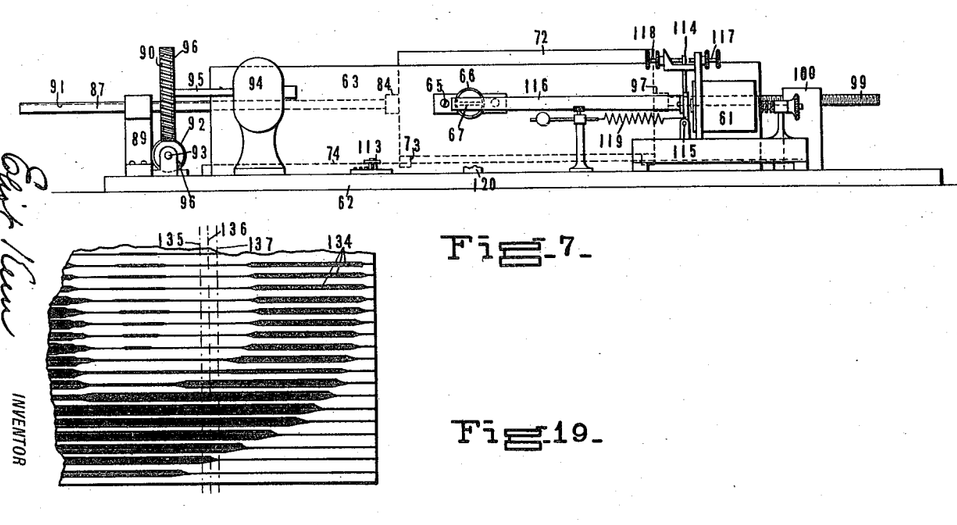
Fig. 7 is a side elevation of the receiving mechanism.
Fig. 19 is a representation of a portion of another form of sending plate.

In Fig. 19 I have represented a sending plate similar to that shown in Fig. 18, except that the paths of the contact points across the surface of the plate indicated by the dotted lines 135, 136, 137 are substantially perpendicular to the lines 134 of varying width forming the tones of the picture.

In many ways I consider the process of transmitting from such a plate to be superior to that utilizing the plate whose lines are angularly disposed to the paths of the contact points. In using such a plate as that illustrated in Fig. 19 the lineal dimension governing the length of the impulse is the true width of the line of the plate at that particular point, instead of a diagonal across that line, such as results from the use of the plate in Fig. 18. While the impulses originated from the plate of Fig. 19 are not staggered in their relation, I find that such an effect is not necessary, since at any point the tone as represented by a line of varying width on the plate is the result of the general tonal effect of the original picture at that point. In using such a plate as a sending device, and then transforming the record obtained therefrom by the machine described and illustrated in my application for Letters Patent Serial Number 548,047, the impulses will be automatically given a staggered relation due to the peculiar construction of the reproducing machine, as described in the said application. The final result, therefore, of the use of a plate such as that shown in Fig. 19 is to produce a representation of the original picture which will give more closely the tonal effect at any point than might be obtained from a sending plate whose contact lines are angularly disposed with reference to the paths of the contact points.

While I have illustrated and described only a single embodiment of the mechanical features of my invention, I realize that it is capable of broad application, and I do not wish to be limited to the precise construction described and illustrated.

Having thus described my invention, I claim:

1. The method of transmitting pictures by electricity, consisting in preparing a transmitting record having its surface divided into a plurality of portions having areas proportional to the tones of corresponding portions of the picture, transmitting successive impulses each of a duration proportional to a dimension of one of said portions, forming a record of said impulses, and reconstructing from said record a substantial counterpart of the original representation by utilizing the records of successive impulses to determine the dimensions of successive areas constituting said counterpart, said areas being proportional to the squares of the durations of said recorded impulses.

2. The process of transmitting representations by electricity comprising the reduction of the representation to a surface having areas of electrical conductivity, the production of electrical impulses from said areas, the formation photographically of a record of said impulses without regard to pictorial or facsimile effect, and the reconstruction from said record of a substantial counterpart of the original representation.

3. The process of transmitting representations by electricity comprising the reduction of the original to a half tone plate having areas of electrical conductivity proportional to the tones of the representation, the production in an electric circuit from said half tone of impulses in length proportional to a lineal dimension of the conducting areas, the formation of a photographic record of such impulses without regard to pictorial or facsimile effect, and the reconstruction from said record of a substantial reproduction of the original representation.

4. The process of transmitting representations by electricity comprising the production of electrical impulses from a representation corresponding to a lineal function of different parts thereof, the formation photographically of a record of said impulses without regard to pictorial or facsimile effect, and the reconstruction from said record of a representation produced by areas of light or shadow corresponding in arrangement and proportional in size to those of the original representation.

5. The process of transmitting representations by electricity comprising the reduction of the representation to a surface having areas of electrical conductivity, the production of electrical impulses from said areas proportional to a lineal dimension thereof, the formation of a record of said impulses, and the reconstruction from said record of a representation produced by areas of light or shadow proportional in area to the second power of the lineal dimension of the recorded impulses.

6. The process of transmitting representations by electricity comprising the reduction of the representation to a surface having areas of electrical conductivity, the production of electrical impulses from said areas, the formation photographically of a record of said impulses, and the reconstruction from said record of a representation produced by areas of light or shadow proportional in area to the second power of a lineal dimension of the recorded impulse on the said record.

7. The process of transmitting pictures by electricity comprising the reduction of the picture to a surface having areas of electrical conductivity proportioned to the depth of tone of corresponding parts of the picture, the production of electrical impulses from said areas proportional in duration to a lineal dimension thereof, the formation of a record of said impulses, and the reconstruction from said record of a picture having areas of varying tonality proportioned to the second powers of the lineal dimensions of the recorded impulses on said record.

8. The process of transmitting pictures by electricity, comprising the reduction of the picture to a half-tone plate having areas of electrical conductivity proportioned to the tones of the original picture, the production of successive series of electrical impulses proportioned in duration to the areas of the dots in successive rows of said half-tone plate, the production of distinctive electrical impulses between each series of impulses corresponding to a row of dots of said plate, the recording of said impulses in series, whereby a record of the impulses is produced in which the record of the dots of each row is separated by the record of a distinctive impulse, and the reconstruction from said record of a picture having areas of varying tonality proportioned to the second powers of the lineal dimensions of the recorded pictorial impulses on said record.

9. In picture telegraph apparatus, a plate having rows of areas of electrical conductivity on the surface thereof, means for causing said plate to progress in a direction oblique to the center lines of said rows, a plurality of contact points, and means for causing the same to sweep across the surface of the plate at an angle to the direction of progression of said plate, the means for progressing said plate and for moving said contact points being proportioned to move said parts in a definite speed ratio, said speed ratio, the angular relation of the direction of movement of said contact points and the direction of progression of said plate, and the angle of obliquity of the center lines of said rows to the direction of progression of said plate being such that successive contact points will sweep over the center lines of successive rows of said areas of electrical conductivity.

10. In picture telegraph apparatus, a plate having contact areas thereon, a carriage for supporting said plate, a rack on said carriage, an endless belt, a contact point thereon adapted to sweep across the contact areas of said plate, pulleys for supporting said belt, a worm revolving with said pulleys and meshing with said rack for causing said plate and carriage to travel in a direction substantially perpendicular to the plane of rotation of the pulleys, and means for causing the rotation of the pulleys.

11. In picture telegraph apparatus, a carriage for supporting a sending element, and means for adjusting the position of said element with respect to said carriage including a fulcrum engaging one edge of said element.

12. In picture telegraph apparatus, a carriage for supporting a sending element, and means for adjusting the position of said element with respect to said carriage, including a fulcrum engaging one edge of said element, and an adjustable toggle engaging another edge of said element.

13. In picture telegraph apparatus, a carriage for supporting the sending element, and means for adjusting said element with respect to said carriage including a fulcrum engaging one edge of said element, an adjustable toggle engaging an edge of said element, and springs acting to maintain the edge of said element in contact with said toggle.

14. In telegraphic apparatus, a sending element for propagating impulses adapted to be recorded, said element comprising a half tone plate having areas of electrical conductivity proportioned to the tones of the picture upon the plate, and means independent of said element for causing an impulse similar in character to those originated by the sending element to traverse a circuit of the apparatus at a definite period in the cycle thereof.

15. In picture telegraph apparatus, a sending element having contact areas thereon, and a contact strip extending adjacent thereto throughout the length thereof for causing an impulse at a definite period in the operation of said device independent of the relative position of said contact areas.

16. In picture telegraph apparatus, a plate having contact areas thereon, a contact point, means for causing said point to sweep across said contact areas, and a contact strip adjacent to said plate and adapted to be traversed by said point before the latter contacts with said areas.

ELIOT KEEN.

Witnesses:
   GERALD E. TERWILLIGER,
   EDMUND QUINCY MOSES.